United States Patent [19]

Jackson

[11] 4,361,661

[45] Nov. 30, 1982

[54] THERMAL BACKFILL COMPOSITION METHOD

[75] Inventor: Kenneth W. Jackson, Gwinnett County, Ga.

[73] Assignee: Western Electric Company, Incorporated, New York, N.Y.

[21] Appl. No.: 152,254

[22] Filed: May 22, 1980

[51] Int. Cl.³ .................. C08L 63/00; C08L 67/00; C08L 71/00

[52] U.S. Cl. .................. 523/442; 523/132; 523/400; 523/457; 523/458; 523/459; 523/466; 523/467; 523/443; 524/447; 524/493; 524/496; 524/560; 524/563; 524/601; 524/611; 524/612; 524/430; 524/431; 524/432; 524/433; 524/439; 524/440

[58] Field of Search ............ 260/42, 47, 37 EP, 40 R, 260/37 R; 106/272; 523/132, 400, 457, 458, 466, 467, 442, 443; 524/447, 493, 496, 563, 601, 430, 431, 532, 611

[56] References Cited

U.S. PATENT DOCUMENTS

| | | | |
|---|---|---|---|
| 1,939,937 | 12/1933 | Werner | 252/5 |
| 2,751,775 | 6/1956 | Sergovic | 260/40 R |
| 3,328,231 | 6/1967 | Sergovic | 260/40 R |
| 3,405,066 | 10/1968 | McGhee et al. | 252/63.5 |
| 3,801,536 | 4/1974 | Guenantin | 260/40 R |
| 4,003,426 | 1/1977 | Best et al. | 165/5.3 |
| 4,042,012 | 8/1977 | Perry et al. | 165/1 |
| 4,142,576 | 3/1979 | Perry et al. | 165/45 |
| 4,177,078 | 12/1979 | Helna et al. | 106/67 |

FOREIGN PATENT DOCUMENTS 257661 4/1949 Switzerland.
260480 7/1949 Switzerland.

OTHER PUBLICATIONS

Mitchell et al.: Backfill Materials for Underground Power Cables; EPRI; 6/77.
Cox et al.; Developments in UK Cable-Installation Techniques to Take Account of Environmental Thermal Resistivities; *Proc. IEE,* vol. 122, No. 11, Nov. 1975.
Mochinski et al.: Assessment of the Influence of Soil Thermal Resistivity on the Ratings of Distribution Cables; *Proc. IEE,* vol. 123, No. 1; Jan. 1976.
Farouki; Physical Properties of Granular Materials with Reference to Thermal Resistivity; *Highway Research Bulletin,* vol. 189, 1960.

*Primary Examiner*—Lewis T. Jacobs
*Attorney, Agent, or Firm*—J. F. Spivak

[57] ABSTRACT

A thermally conductive composition comprises an essentially homogeneous mixture of sand or sand-like particulate material with a binder, wherein the binder comprises an organic adhesive having an inorganic fine particle filler therein. The binder is present in at least an amount sufficient to begin to form a binder meniscus between adjacent sand particles, while the filler is present in the binder in an amount which significantly increases the effective thermal conductivity of the composition as compared to the same composition without filler.

15 Claims, 9 Drawing Figures

CODE: ADHESIVE / FILLER / AIR

FILLER PARTICLES DISCRETELY INTERSPERSED IN ADHESIVE MATRIX
(a)

FILLER PARTICLES TOUCHING BUT COUPLED WITH ADHESIVE
(b)

THERMAL BACKFILL COMPOSITION METHOD

TECHNICAL FIELD

This invention relates to methods and compositions for preparing thermally conductive sand-like composite materials useful, for example, as thermally conductive backfill materials or thermally conductive molds. In particular, this invention relates to mixtures generally comprising sand with a binder comprising an organic adhesive having an inorganic filler therein to yield a composite having a substantially greater thermal conductivity than dry sand.

BACKGROUND OF THE INVENTION

The effective thermal conductivity of soil or soil-like granular materials is a key property which can significantly affect the design and performance of a buried system which must dissipate heat to, or extract heat from, its surroundings. For example, efficient operation of systems including direct buried high voltage power transmission cables, pipe grids for ground source heat pumps and oil pipe lines depends upon the transfer of heat between system components and the ground. In the foundry industry, the effective thermal conductivity of sand coating mold inserts can affect the quality of the castings obtained from the molds.

Examining the case of buried high voltage transmission cable in more detail, it can be shown that the power that can be delivered to a load depends upon the current carrying capacity (ampacity) of the cable. This ampacity is limited by the operating temperature of the cable which in turn depends upon the ability of the surrounding soil to dissipate the heat generated in the cable. Failure of the soil to sufficiently dissipate the heat can result in failure of the cable insulation. Also, at lower temperatures, the efficiency of power transmission of the cable is improved due to a lowering of the $I^2R$ losses. The use of thermal backfill materials to surround undergound cable and the like has been suggested in order to enhance the heat dissipation of dry sand.

It has been generally accepted that while other materials, e.g., pure quartz, alumina, beryllia and the like may have higher thermal conductivities than sand and are certainly suitable substitutes, due to economic reasons, sand is preferred as the base component of such backfill compositions. While it is recognized that moist sand has a substantially high thermal conductivity ($\sim 3$ W/m−K), once drying begins due to the heat to be dissipated, the water in the sand surrounding the heat source is evaporated and the sand dries. The dry sand, which has a thermal conductivity of only about one-tenth that of moist sand, acts essentially as a thermal insulator, inhibiting the dissipation of heat and causing reduced efficiency and possibly eventual failure of the cable. There is, therefore, a need for backfill materials having a relatively high thermal conductivity (as compared with dry sand) which is substantially independent of moisture content. These same materials, of course, may have uses in addition to that of backfill materials, such as in molds for castings.

In the past, attempts to increase the thermal conductivity of sand and sand-like materials have included mixing sand with a wax binder, mixing and firing of sand or gravel with inorganic binders such as Kaolinite, calcium carbonate, fly ash and lime. Farouki, who reported the latter experiments, concluded that for moisture contents less than about 4%, the optimum amount of inorganic binder was about 8 wt. percent. He also reported that with sand, at a dry density of about 2 gm/cm$^3$, without binder, the thermal conductivity was 0.91 W/m−K and with 8 wt. % kaolin it was 2.0 W/m−K with little difference between binders. Mitchell, a researcher experimenting in wax as a binder alluded to the incorporation of alumina into the wax but indicated that the incorporation of additives, such as alumina into the wax, did not significantly increase the effective thermal conductivity, $k_e$, of the composite backfill. Similarly, Cox et al, reported on cement/sand, gravel/sand and bitumen/sand mixtures as backfill materials having values of $k_e$ of no less than 0.83 W/m−K.

SUMMARY OF THE INVENTION

A thermally conductive composition comprises an essentially homogeneous mixture of sand or sand-like particulate material with a binder, wherein the binder comprises an organic adhesive having an inorganic fine particle filler therein. The binder is present in at least an amount sufficient to begin to form a binder meniscus between adjacent sand particles, while the filler is present in the binder in an amount which significantly increases the effective thermal conductivity of the composition as compared to the same composition without filler.

A thermal backfill material is prepared by mixing sand removed from the earth together with components which form a binder. The binder components include an organic adhesive and a fine particle inorganic filler in proportions as indicated above, so as to result in a composite having an effective thermal conductivity greater than that of either the dry sand alone, or that resulting from a mixture of sand with either adhesive alone or filler alone. The composite backfill may also include other agents, such as, defoamers to decrease air entrapment, surfactants/dispersant to increase wetting of the sand particles by the binder adhesive and coupling agents to increase adhesion of adhesive to inorganic filler and sand.

DETAILED DESCRIPTION

My research indicates that one of the most important factors in determining the thermal conductivity of a sand-like composite material is its structure. Specifically, the thermal conductivity of the thermal composite will be the greatest when the continuous matrix is the component with the highest thermal conductivity, and the volume portions of the discrete, lower conductivity components are a minimum. Because the low thermal conductivity air forms the continuous matrix in dry, sand-like granular materials, these materials are inherently good thermal insulators rather than thermal conductors. Therefore, in order to increase the effective thermal conductivity of such material it is necessary to thermally couple adjacent sand grains with a binder having a thermal conductivity which is high as compared to that of air. Coupling of the sand grains must be so extensive, such that the coupled sand grains become the continuous matrix and air, if any be left, remaining as discontinuous voids within the continuous matrix.

The term sand-like materials as used herein is meant to describe all sorts of cohesionless granular materials, for example, Ottawa sand, Masonry sand, Fire sand and any other ordinary commonly available natural sands as well sand-clay mixtures, gravel, graphite or other inorganic particles of a particle size range generally found in natural sand (0.1–2 mm). For example, alumina, calcite, silica, and other metal oxides as well as metal particles and any other inorganic particulate matter having thermal conductivities equal to or greater than dry sand are suitable sand-like particles in accordance with my invention. It is, of course, preferred that the sand-like material used as part of the composite of the present invention have as high a thermal conductivity as possible. However, one must often forego this requirement and accept material of lesser thermal conductivity due to the cost factor. This cost factor is why natural sands, which are generally quartzitic in structure are preferred in the novel thermal backfill materials. This is especially true since the same sand or earth being excavated so as to form a trench in which to lay cable or other heat sources or sinks therein can be used for making the thermal backfill composite by mixing it with adhesive and filler as taught herein.

Figure 2:
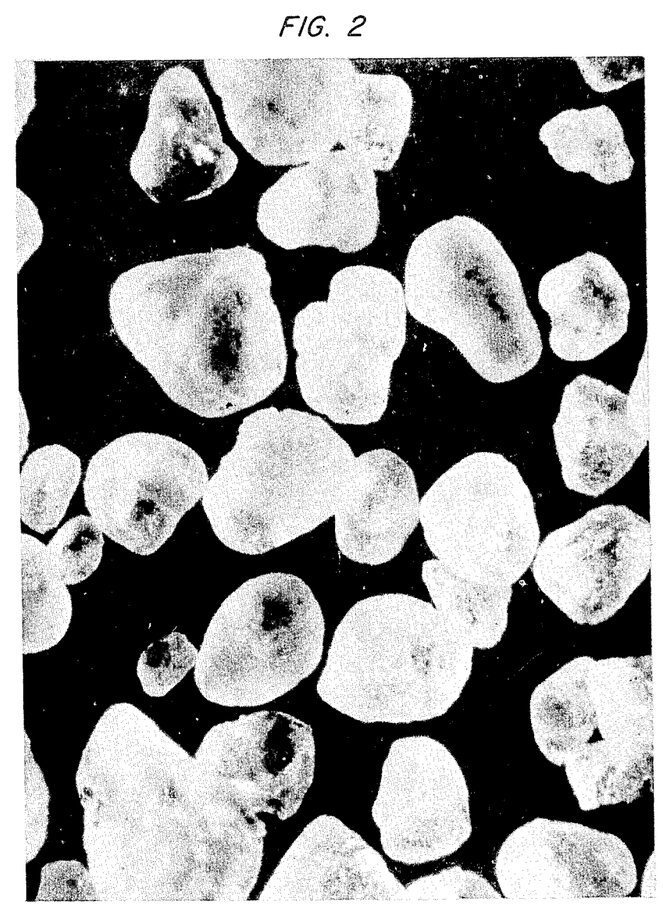
FIG. 2 is a photomicrograph of Ottawa sand grains showing predominantly rounded type grains.
Figure 3:
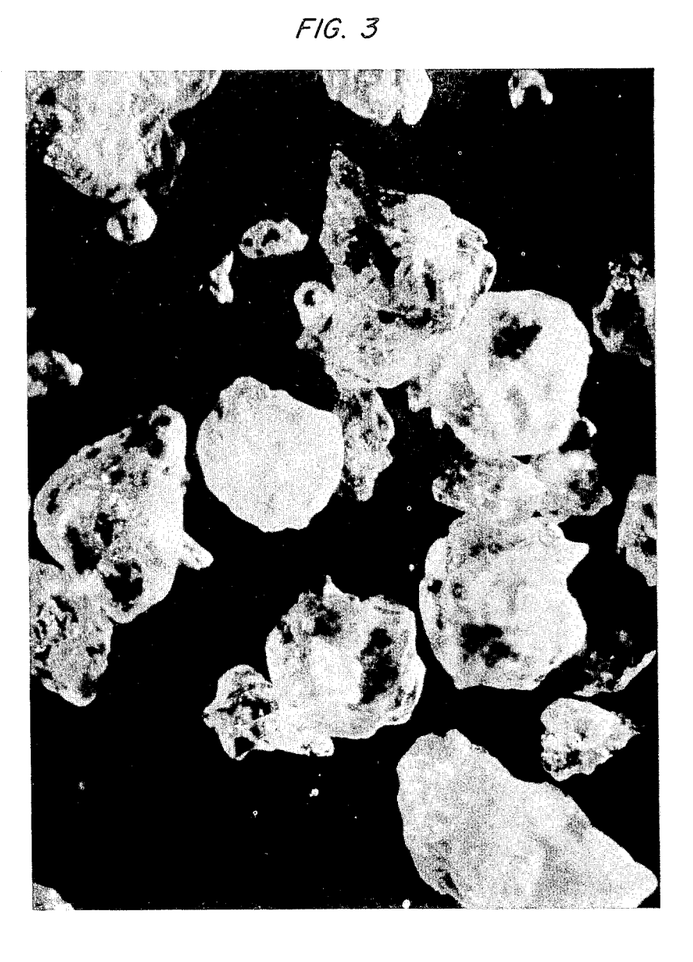
FIG. 3 is a photomicrograph of "Masonry-type" sand grains showing predominantly angular grains.
Figure 4:
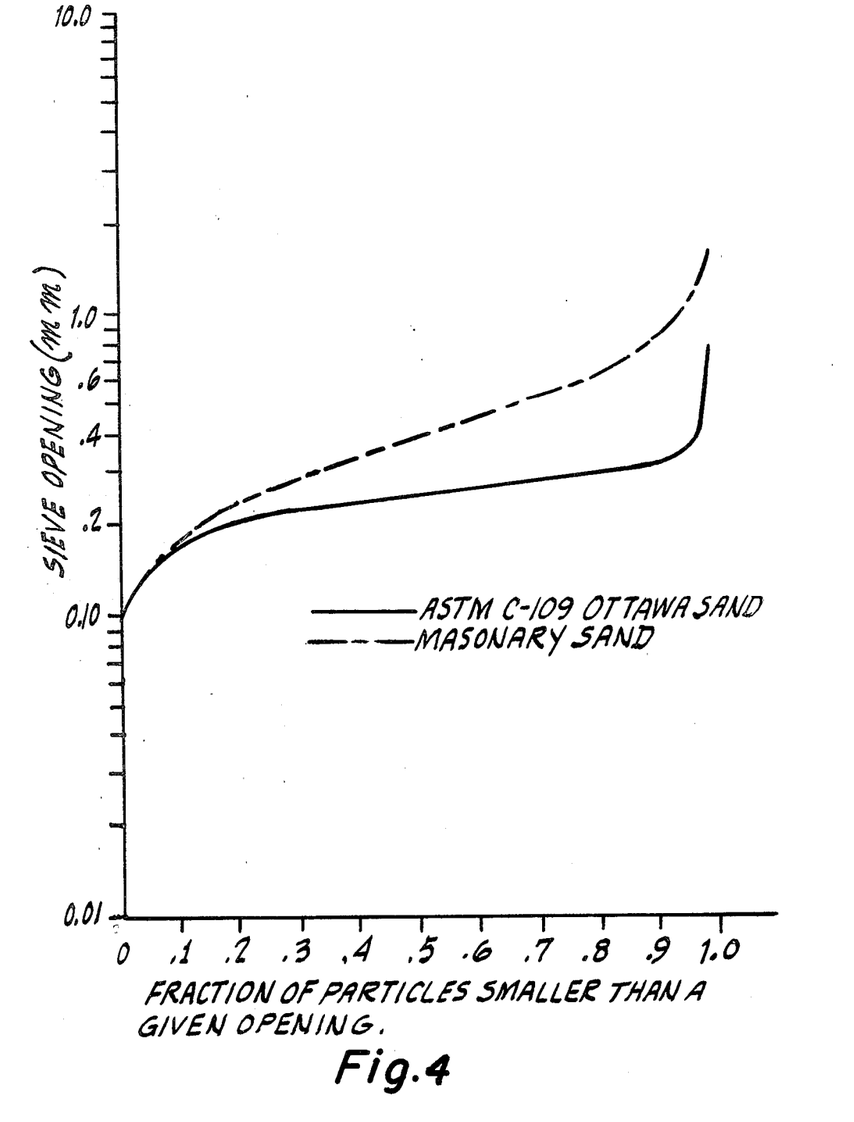
FIG. 4 is a particle size distribution curve for Ottawa sand and Masonry sand.

Another factor with relationship to the sand-like materials is their physical shape, by this is meant whether the material is comprised of generally well-rounded particles or generally angular particles or particles which fall more in the angular range rather than the well-rounded range. By a well-rounded particle it is meant a particle having no or few rough edges and being generally round and smooth in shape. The term angular particle is meant to include particles the shape of which is predominantly not rounded and in fact contain many sharp points or projections at their surface. It has generally been found that it is preferred that the sand-like particles of the novel composite be predominantly angular particles rather than well-rounded particles due to the fact that greater interparticle contact area may be provided with angular particles as compared with rounded particles. Such greater interparticle contact area allows for greater interparticle thermal conduction. For example, as can be seen from FIGS. 2 and 3, masonary type sand is more angular than Ottawa sand and is therefore preferred over it.

Figure 1:
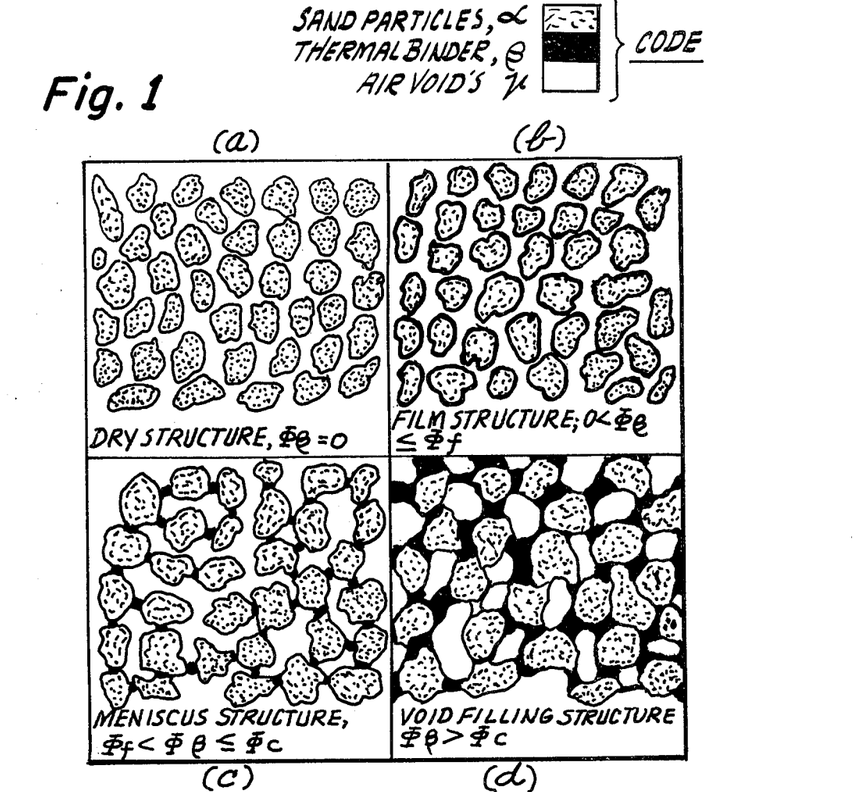
FIG. 1 is a schematic cross-sectional representation of the microstructure of (a) dry sand, (b) dry sand having a binder film therearound, (c) dry sand having sufficient binder mixed therewith so as to form a binder meniscus between adjacent sand particles, and (d) dry sand having sufficient binder mixed therewith so as to start to fill the voids or interparticle air spaces.

I have discovered that an extremely important criteria in providing a thermal backfill material is the use of a binder comprising an organic adhesive having a relatively large quantity of small particle size inorganic particulate filler material therein. Typically the mass ratio of filler to adhesive is from 80% to 95%. In order to be an effective binder material, the binder for the sand-like particles must be present in a quantity greater than that required to form what is termed the "film structure" but need not be, and for best cost consideration, should not be present in a quantity equal to or exceeding the void filling structure. Referring to FIG. 1 there is shown a schematic cross-sectional representation of the various microstructure of sand plus binder. FIG. 1a shows the microstructure of dry sand having no binder mixed therewith. Here the rounded sand particles are in contact with each other by point contacts and in many instances are not in direct contact with other sand particles such that the continuous matrix of the dry sand is the air surrounding the particles rather than the sand itself. This gives rise to a material having a relatively low thermal conductivity. FIG. 1b shows the microstructure of dry sand having a thin binder film therearound. This is known as the film structure. As can be seen from FIG. 1b the volume fraction of binder present in the film structure represented by $\theta_f$, may vary from a small amount, that is an amount greater than 0 to an amount whereby the binder coats the surface of all the particles but does not provide for interparticle thermal coupling or connection other than point contacts through the binder. Here, the thermal conductivity is no greater than that of dry sand and air remains the continuous media. In contrast to the film structure, there is shown in FIG. 1c the "meniscus structure" which arises when one exceeds the amount of binder present for a saturated film structure. In the meniscus structure the volume fraction of binder, $\phi_B$, is greater than $\phi_f$ but less than or equal to $\phi_c$. Here, a substantial amount of interparticle contact through the binder is obtained by virtue of meniscus formation of binder material between adjacent sand particles. When the amount of binder present is sufficient to establish essentially meniscus type structure throughout the composite, the continuous phase of the composite becomes the sand-binder combination, C and B, while the air then becomes the discontinuous phase. At this time, enhanced thermal conductivity may be obtained. It is the quantity of binder which gives the meniscus structure which represents the preferred range of binder-sand mixtures. Upon continued increase of binder to the sand binder mixture, a void filling structure forms at a volume fraction designated as $\phi_c$, as shown in FIG. 1d. As can be seen from this FIG., enough binder is present so that not only does meniscus between adjacent sand particles form, but sufficient binder is present to substantially start to replace the air voids in the composite with binder material. While there may be a slight increase in thermal conductivity as additional binder is added after $\phi_c$, the void filling structure, is reached, the cost factors involved are generally such that it is not preferred to add binder so as to form this structure. Furthermore, if binder is added beyond which is necessary to essentially fill all voids, such added binder may also cause a greater interparticle distance which may cause a decrease in the thermal conductivity of the composite where the thermal conductivity of the binder is less than that of the sand-like particles.

The specific volume fraction, $100f$ of binder to form the film structure on the surface of the sand grains is a function of the film thickness which will develop prior to meniscus formation and depends somewhat on the viscosity of binder and surface tension thereof and also on the specific type of surface of the sand-like grains, that is, the shape, size and surface area of the grains and the interaction or wettability of the sand particles with the binder. Generally, coarse textured sand grains and/or very small sand grains will have a larger value of $\phi_f$ than grains with a finer surface texture and large size. This means that a larger volume fraction of binder will be required to form the desired meniscus structure with coarse textured, small sand grains than with fine textured large grains.

I have found that the meniscus stage of microstructural development produces a dramatic increase in the effective thermal conductivity of the composite because of the formation of interparticle thermal coupling. The heat flow for this microstructure is predominantly through the sand-binder interface rather than the air as it is in dry sand or in the film structure. The meniscus structure exists until essentially all the grains have coupled with binder. Referring to the binder portion of the novel backfill composite, the binder comprises on organic adhesive having an inorganic particulate filler therein. To be useful in backfill materials the binder to be added to the sand should preferably meet several criteria. For example, the adhesive portion of the binder should be addable to the sand in liquid form so as to obtain better coupling with the sand particles and to facilitate the ease of compounding the composite at a field site with conventional equipment such as cement mixers; any liquid binder must then be solidifiable after installation of the backfill so that it is not subsequently washed away by rainfall; the binder should remain flexible to accommodate thermal expansion and contraction without rupture of intergranular bonds which would degrade the thermal conductivity of the composite backfill; the binder should provide good adhesion between the backfill and heat source or sink which it encases and such bonding or adhesion should not be so strong as to make disinterment of the encased heat source or sink unusually difficult. In addition, the binder should be able to withstand extended exposure to water and operating temperatures of the heat source or sink and should be substantially nontoxic, nonbiodegradable, and noncorrosive to the heat source or sink. While it is preferred to employ water emulsifiable adhesives as the binder base, such as low molecular weight latex polymers or copolymers, one may use other adhesive material such as epoxies, rubbers and waxes. The water soluble adhesives such as acrylic latex adhesives are especially suitable when the backfill material is mixed on-site in a cement mixer or other mixing apparatus utilizing the removed earth together with the adhesive and filler. The backfill material of this invention is substantially water free, at least after it has dried and set.

Typically, the thermal conductivity of dry sands, such as Ottawa sand or Masonry sand, is between about 0.3–0.4 W/m−K. Also, typically the thermal conductivity of adhesive materials used in the binder are less than this value. For example, the thermal conductivity of paraffin wax which may be used as a binder is about 0.27 W/m−K.

Figure 5:
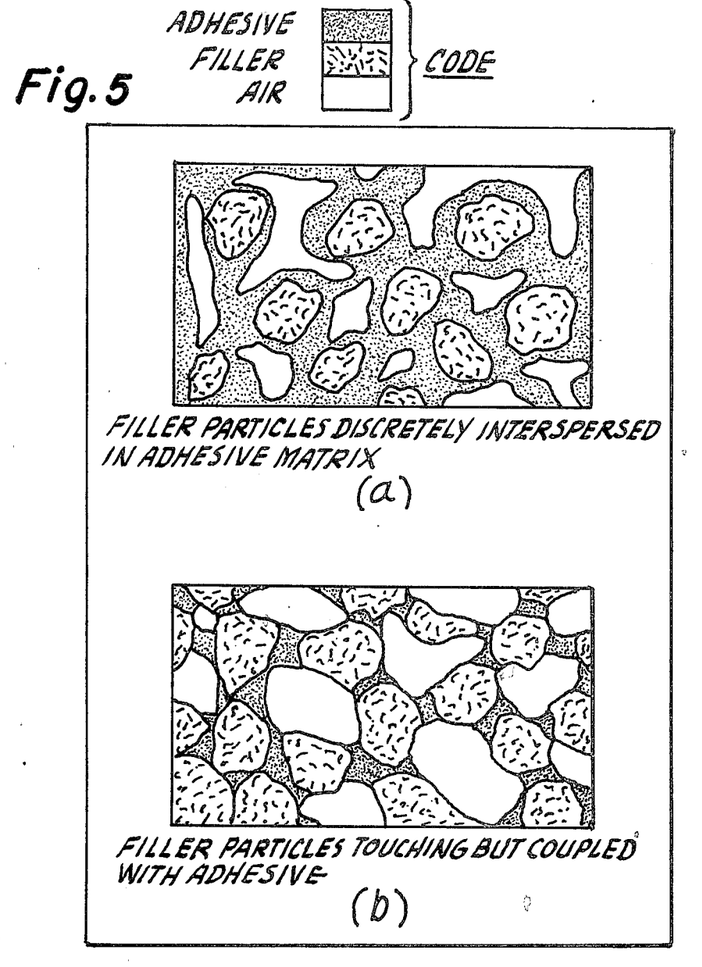
FIG. 5 is illustrative of microstructures of the binder portion of the backfill composite.

Polymeric resins in either their liquid or solid state generally have a thermal conductivity of about $\frac{1}{2}$ to $\frac{1}{3}$ that of water. Also, due to the porosity of particulate inorganic binders, these binders also have thermal conductivities less than that of water. Thus, because the thermal conductivity of the organic and inorganic binders are less than that of water, it would appear that the effective thermal conductivity of backfill materials which use these binders will be less than that of a sand with an equivalent volume moisture content. This is indeed the case when the organic or inorganic binder is used by itself with the sand. However, I have discovered that if an organic/inorganic composite binder can be constructed with a meniscus type microstructure, that is, where $\phi_B$ is greater than $100 f$ but less than or equal to $\phi_c$, then the effective thermal conductivity of this binder can approach that of water. For example, the effective thermal conductivity of a composite wax binder, comprising micron-sized quartz particles (predominantly 1–30 $\kappa$), coupled with sand grains where the wax constitutes about 0.04 parts by volume is about 1.6 W/m−K. This composite will have a meniscus type microstructure and the effective thermal conductivity of the sand-binder backfill composite will be significantly greater than sand with either the organic or inorganic constituents of the binder alone. FIG. 5($a$ and $b$) illustrates the microstructure of a composite binder consisting of an adhesive having inorganic particles dispersed therein. In FIG. 5($a$) the filler particles are interspersed with few interparticle contacts and large interparticle spacing. In FIG. 5($b$), the preferred structure, the high thermal conductivity filler particles have interparticle contact and small spacing.

Formulation variables of composite binders which affect the thermal conductivity of the composite backfill material include the chemical composition, the relative proportions of the organic adhesives and inorganic filler that comprise the binder, the size of the filler particles and the surface properties of the specific filler and adhesive system as well as the ratio of binder to sandlike base material.

The effect of the composition of the binder on the effective thermal conductivity of Ottawa sand was determined by measuring the effective thermal conductivity as a function of the mass fraction of filler for different values of the mass fraction of the organic adhesives. Water-based latexes and paraffin wax were investigated as adhesives. It should be noted, however, that other adhesives, such as, epoxies, polyesters, polyethers polyhydroxy compounds, rubber type elastomers and the like are also suitable adhesives. Latex type adhesives are especially suitable for use in the binder due to the fact that many latexes have a thermal conductivity of about one-third that of water and because they can readily be mixed with water and filler materials to form liquid dispersions which can readily be mixed with moist sand using conventional type mixing equipment. In addition, most of the latexes are substantially nontoxic and noncorrosive. The fillers studied were two forms of microcrystalline quartz, Georgia Kaolin and graphite. Similarly, any other inorganic particulate material may also be used as a filler. Preferably the filler has a high thermal conductivity. The microcrystalline quartz and the Georgia Kaolin were selected primarily because of their low cost and general availability, while the graphite filler was selected because of its high thermal conductivity.

Table 1 lists the thermal conductivities obtained for various adhesives and fillers. Table 2 gives the thermal conductivity for different formulations of novel backfill composites using adhesives and fillers in accordance with this invention.

TABLE 1
TYPICAL PROPERTY DATA FOR ADHESIVES AND FILLERS

| | Density gm/cm³ | Thermal Conductivity W/m — °K. |
|---|---|---|
| Adhesive | | |
| Paraffin Wax | 0.9 | 0.25–0.30 |
| Acrylic Latex | 1.02–1.13 | 0.17–0.21 |
| Fillers | | |
| Microcrystalline quartz | 2.65 | 8.54 |
| Georgia Kaolin | ~2.4 | |
| Graphite | 2.25 | 5.0 |

TABLE 2
BACKFILL FORMULATIONS

| Components | Weight (gms) | Bulk Density gm/cm³ | Effective Thermal Conductivity, $K_e$, W/m — °K. |
|---|---|---|---|
| 1. Ottawa Sand | 1000 | 1.79 | 2.12 |
| Novacite L-207A | 50 | | |
| Gulfwax | 21 | | |
| 2. Ottawa Sand | 1000 | 1.79 | 1.24 |
| Novacite L-207A | 100 | | |
| Gulfwax | 22 | | |
| 3. Ottawa Sand | 1000 | 1.80 | 2.32 |
| Novacite L-207A | 50 | | |
| Gulfwax | 42 | | |
| 4. Ottawa Sand | 1000 | 1.85 | 3.37 |
| Novacite L-207A | 100 | | |
| Gulfwax | 44 | | |
| 5. Ottawa Sand | 1000 | 1.85 | 2.43 |
| Novacite L-207A | 150 | | |
| Gulfwax | 46 | | |
| 6. Ottawa Sand | 1000 | 1.87 | 1.89 |
| Novacite L-207A | 200 | | |
| Gulfwax | 72 | | |
| 7. Ottawa Sand | 1000 | 1.84 | 2.17 |
| Novacite L-207A | 50 | | |
| Gulfwax | 63 | | |
| 8. Ottawa Sand | 1000 | 1.86 | 2.74 |
| Novacite L-207A | 100 | | |
| Gulfwax | 66 | | |
| 9. Ottawa Sand | 1000 | 1.85 | 3.12 |
| Novacite L-207A | 150 | | |
| Gulfwax | 63 | | |
| 10. Ottawa Sand | 1000 | 1.87 | 3.24 |
| Novacite L-207A | 200 | | |
| Gulfwax | 72 | | |
| 11. Ottawa Sand | 1000 | 1.87 | 1.78 |
| Novacite L-207A | 300 | | |
| Gulfwax | 78 | | |
| 12. Ottawa Sand | 1000 | 1.87 | 1.77 |
| Novacite L-207A | 350 | | |
| Gulfwax | 81 | | |
| 13. Ottawa Sand | 1000 | 1.84 | 2.85 |
| Asbury #A-99 Graphite | 100 | | |
| Gulfwax | 44 | | |
| 14. Ottawa Sand | 1000 | 1.86 | 3.32 |
| Asbury #A-99 Graphite | 100 | | |
| Gulfwax | 55 | | |
| 15. Ottawa Sand | 1000 | 1.83 | 2.14 |
| Georgia Kaolin | 50 | | |
| Gulfwax | 42 | | |
| 16. Ottawa Sand | 1000 | 1.84 | 1.45 |
| Georgia Kaolin | 100 | | |
| Gulfwax | 44 | | |
| 17. Ottawa Sand | 1000 | 1.78 | 1.06 |
| Hycar* | 43 | | |
| #388 defoamant | 0.22 | | |
| 18. Ottawa Sand | 1000 | 1.76 | 1.09 |
| Hycar | 84 | | |
| #388 defoamant | 0.42 | | |
| 19. Ottawa Sand | 1000 | 1.84 | 1.83 |
| Novacite L-207A | 40 | | |
| Hycar | 43 | | |
| T-731 dispersant | 0.40 | | |
| Water | 14 | | |
| #388 defoamant | 0.29 | | |
| 20. Ottawa Sand | 1000 | 1.88 | 2.26 |
| Novacite L-207A | 100 | | |
| Hycar | 45 | | |
| T-731 dispersant | 1.0 | | |
| Water | 14 | | |
| #388 defoamant | 0.30 | | |
| 21. Ottawa Sand | 1000 | 1.93 | 2.26 |
| Novacite L-207A | 150 | | |
| Hycar | 47 | | |
| T-731 dispersant | 1.5 | | |
| Water | 15 | | |
| #388 defoamant | | | |
| 22. Ottawa Sand | 1000 | 1.88 | 2.02 |
| Novacite L-207A | 200 | | |
| Hycar | 49 | | |
| T-731 dispersant | 12 | | |
| Water | 16 | | |
| #388 defoamant | 0.33 | | |
| 23. Masonry-type Sand | 1000 | 1.83 | 2.43 |
| Novacite L-207A | 100 | | |
| Hycar | 45 | | |
| T-731 dispersant | 1.0 | | |
| Water | 14 | | |
| #388 defoamant | 0.30 | | |
| 24. Ottawa Sand | 1000 | 1.89 | 1.94 |
| Novacite L-207A | 60 | | |
| Hycar | 43 | | |
| Water | 14 | | |
| Dow Corning Z-6030 Silane | 0.3 | | |
| 25. Ottawa Sand | 1000 | 1.90 | 1.92 |
| Novacite L-207A | 60 | | |
| Hycar | 43 | | |
| Water | 14 | | |
| Dow Corning Z-6040 Silane | 0.3 | | |
| 26. Ottawa Sand | 1000 | 1.83 | 1.86 |
| Novacite L-207A | 60 | | |
| Hycar | 43 | | |
| Water | 14 | | |
| 27. Ottawa Sand | 1000 | 1.86 | 1.82 |
| Georgia Kaolin | 60 | | |
| Sodium Hixametaphosphate | 0.9 | | |
| Water | 68 | | |
| 28. Ottawa Sand | 1000 | 1.87 | 1.80 |
| 30 Micron Min-U-Sil | 60 | | |
| Hycar | 43 | | |
| T-731 dispersant | 6 | | |
| Water | 14 | | |
| #388 defoamant | 0.29 | | |
| 29. Ottawa Sand | 1000 | 1.84 | 1.85 |
| 15 Micron Min-U-Sil | 60 | | |
| Hycar | 43 | | |
| T-731 dispersant | 6 | | |
| Water | 14 | | |
| #388 defoamant | 0.29 | | |
| 30. Ottawa Sand | 1000 | 1.87 | 1.84 |
| 10 Micron Min-U-Sil | 60 | | |
| Hycar | 43 | | |
| T-731 dispersant | 6 | | |
| Water | 14 | | |
| #388 defoamant | 0.29 | | |
| 31. Ottawa Sand | 1000 | 1.87 | 1.90 |
| 5 Micron Min-U-Sil | 60 | | |
| Hycar | 43 | | |
| T-731 dispersant | 6 | | |

TABLE 2-continued
BACKFILL FORMULATIONS

| | Composition | | Effective |
|---|---|---|---|
| Components | Weight (gms) | Bulk Density gm/cm$^3$ | Thermal Conductivity, $K_e$, W/m − °K |
| Water | 14 | | |
| #388 defoamant | 0.29 | | |
| 32. Ottawa Sand | 1000 | 1.89 | 1.94 |
| Novacite L-207A | 60 | | |
| DLR-C emulsion @ | | | |
| 60% resin solids | 35 | | |
| T-731 dispersant | 6 | | |
| Water | 14 | | |
| #388 defoamant | 0.25 | | |
| 33. Ottawa Sand | 1000 | 1.77 | 3.40 |
| #A-99 Graphite | 42 | | |
| Hycar | 43 | | |
| T-731 dispersant | 1.2 | | |
| Water | 58 | | |
| #388 defoamant | 0.5 | | |
| 34. Ottawa Sand | 1000 | 1.77 | 1.39 |
| Poly-EM 40 emulsion @ | | | |
| 50% resin solids | 73 | | |
| Water | 13 | | |
| #388 defoamant | 0.43 | | |
| 35. Ottawa Sand | 1000 | 1.82 | 1.43 |
| #A-99 Graphite | 42 | | |
| Portland cement | | | |
| Type I | 33 | | |
| T-731 dispersant | 1.2 | | |
| Water | 102 | | |
| 36. Ottawa Sand | 1000 | 1.80 | 1.33 |
| #A-99 Graphite | 28 | | |
| Hycar | 29 | | |
| Portland cement | | | |
| Type I | 33 | | |
| T-731 dispersant | 1.2 | | |
| Water | 87 | | |
| #388 defoamant | 0.60 | | |
| 37. Ottawa Sand | 1000 | 1.84 | 0.482 |
| Novacite L-207A | 50 | | |
| 38. Ottawa Sand | 1000 | 1.85 | 0.525 |
| Novacite L-207A | 100 | | |
| 39. Ottawa Sand | 1000 | 1.85 | 0.498 |
| Novacite L-207A | 150 | | |
| 40. Ottawa Sand | 1000 | 1.84 | 0.506 |
| Novacite L-207A | 250 | | |

*Hycar - Hycar 2600 × 308 emulsion @ 48.7% resin solids.

The thermal conductivity for backfill materials described in Table 2 and using a paraffin wax with a novaculite filler were prepared as follows. First a dry mixture of Ottawa sand, the novaculite filler and the wax were heated in the weight proportions shown to about 343K and manually blended with a trowel to give a homogeneous mixture. This mixture was then compacted in a specimen mold to a volume fraction of sand grains of 0.63 to 0.69. The mass fraction of the novaculite filler, as shown, is based upon the mass of the dry sand. However, the mass fraction of the wax adhesive, as shown, is based upon the mass of the combination of dry sand and filler.

Figure 6:
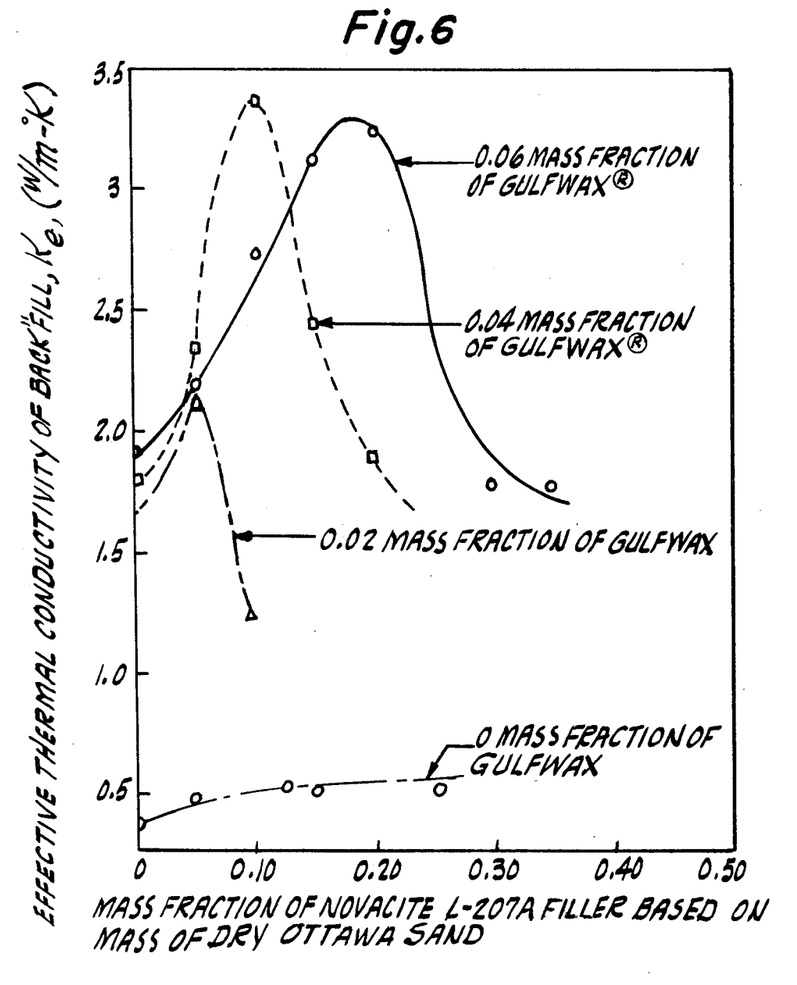
FIG. 6 is a graph showing the effective thermal conductivity of Ottawa sand backfill as a function of the mass fraction of Novacite ® L-207A* filler (Mfg. by Molverne Minerals Co., Hot Springs, Ark.) for different mass fractions of Gulfwax ® adhesive, a paraffin wax.
Figure 7:
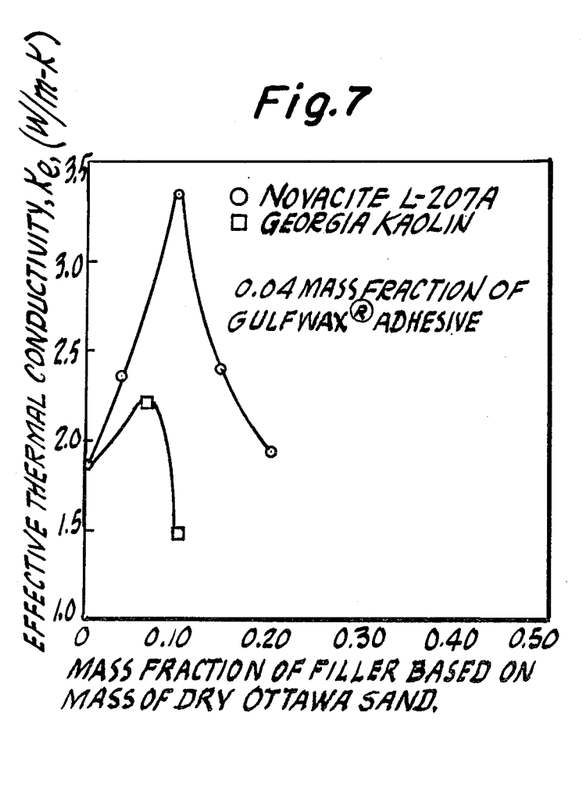
FIG. 7 is a graph showing the effective thermal conductivity of Ottawa sand backfill as a function of the mass fraction of various fillers using a wax adhesive at a constant mass fraction.

Referring to FIG. 6 there is shown the effective thermal conductivity of Ottawa sand backfill as a function of the mass fraction of Novacite L207A filler for different mass fraction of Gulfwax adhesive. It can be seen from this FIG. that the backfill materials having only inorganic filler without the paraffin wax have very low thermal conductivities (in the range of 0.35 to 0.55 W/m − K). It can also be seen that backfill compositions having only Gulfwax in mass fractions between 0.02 and 0.06 but no Novacite have thermal conductivities of between about 1.6 to 1.8 W/m − K. But most important is the unexpected discovery that the amount of filler material in the adhesive is highly critical in obtaining increased thermal conductivity. FIG. 6 indicates that for a given mass fraction of the wax adhesive, the effective thermal conductivity increases to a maximum and then decreases as the mass fraction filler is further increased. The maximum value of the effective thermal conductivity is seen to occur at a wax to Novacite mass ratio of from about 0.34 to 0.42 for wax mass fractions of 0.02 to 0.06. This heretofore unknown phenomenon is believed to occur due to the fact that the initial addition of filler to the binder increases the effective thermal conductivity of the binder and also to a small extent the contiguity of binder to sand particles. The surface tension forces of the binder affects its ability for concentrating the binder at the sand grain contact points. This, in turn, decreases the sand-binder contiguity to such an extent that it causes a net decrease in the thermal contiguity parameter. Thus, there is a critical value of the adhesive/filler ratio for a given sand/adhesive/filler composition below which the binder loses its liquidity and the effective thermal conductivity of the backfill material decreases. Referring to FIG. 7, there is shown the effective thermal conductivity of Ottawa sand backfill material as a function of the mass fraction of novaculite, Georgia Kaolin and graphite fillers at a constant mass fraction of wax adhesive equal to 0.04. This FIG. again shows the criticality of the amount of filler in the binder. It is seen that the value of the wax to kaolin ratio is greater than that for the wax to novaculite ratio. This difference may be attributed to the different wetting characteristics of the filler materials with respect to the wax adhesives.

Figure 8:
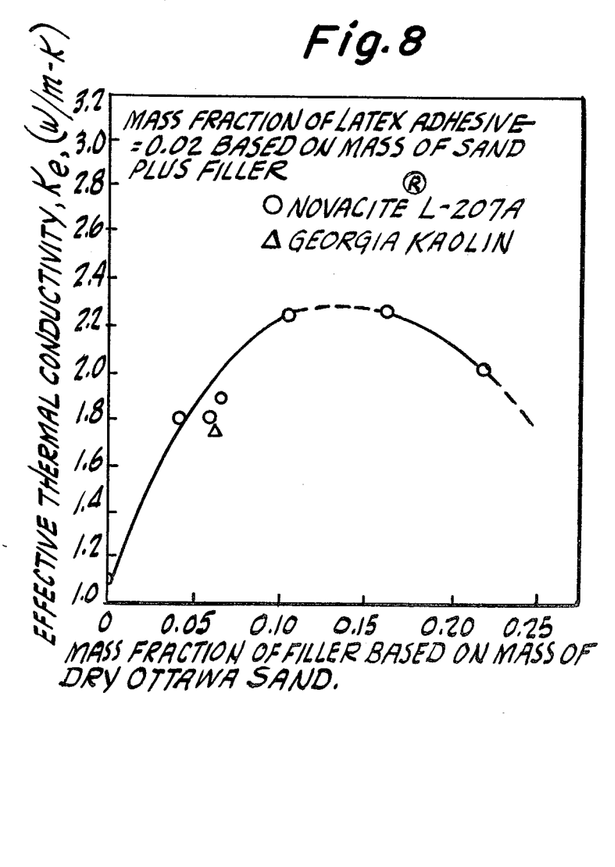
FIG. 8 is a graph showing the effective thermal conductivity of Ottawa sand backfill as a function of the mass fraction of various fillers utilizing about a 0.02 mass fraction of acrylic latex adhesive.

The ratio for Georgia Kaolin at the peak $k_e$ is 0.54 while that of novaculite and graphite is about 0.40. FIG. 8 shows the effective thermal conductivity as a function of the mass fraction of about filler for Ottawa sand backfill material containing a 0.02 mass fraction of an acrylic latex adhesive (Hycar 2600×308). The mass fraction of the latex adhesive was selected to give a volume fraction of binder equal to about 0.1 when the mass fraction of filler is equal to about 0.10. I have found that, generally, volume fractions of binder, $\phi_B$, of about 0.1 are preferred. Generally preferred mass fractions of binder to sand are from greater than 0.02 to 0.1.

A peak in $k_e$ can again be seen, although it is not as sharp as with the wax adhesive. Also there appears to be little variation of the peak with the particular filler employed. This is attributable to the better wetting characteristics of the latex adhesive. Referring further to FIG. 8 it can be seen that for filler mass fraction of 0.04 the effective thermal conductivity of the backfill material with a graphite filler is about 3.4 W/m − K whereas the corresponding value for the novaculite filler is about 1.8 W/m − K. This behavior is opposite to that of the backfill materials which use a wax adhesive and is attributed to the improved wetting of the graphite particles by the acrylic latex emulsion and the dispersant/wetting agent contained therein. It should be understood that once one skilled in the art knows of the existence of a peak in $k_e$ as taught herein, one can determine this peak by simple experimentation for any given system.

I have also discovered that the thermal conductivity increase with increasing volume of sand grains is relatively small but starts to increase more rapidly at volume fraction of sand grains is at or greater than 0.65 in the composite. It may also be noted that the inorganic filler particles have average particle sizes substantially less than that of the sand-like material. They are generally present in the binder in an amount so as to represent only a minor fraction of the total mass of the composite. Typically, these filler particles are between 1 and 50 microns in size.

The latex adhesive backfill composites as shown in FIG. 8 were prepared as follows: first a dry mixture of the filler and sand were prepared. Next the latex emulsion, which contained a resin to water mass fraction of about 0.487 was diluted with water to give a water to sand plus filler mass ratio over and above that in the emulsion of about 0.013. This water content was found to give a mixture which could be manually blended without excessive effort and yet did not exhibit an excessive tendency to foam. In order to facilitate blending of the emulsion with the sand and filler, a combination wetting agent/dispersant was added to the emulsion. Also, in order to control foaming of the emulsion during blending, it was found preferable to use a defoamant. The specific wetting agent/dispersant employed was Rohm and Haas T-731 which is a wetting agent. Although any commercial wetting agent should be suitable, the specific defoamant used was Herculese No. 388. Again, any commercial defoamant should be suitable. These particular defoamants were found to be preferable when compared with other similar wetting and defoaming agents. A defoamant mass ratio of about 0.005 of the diluted emulsion and a dispersant mass ratio of about 0.01 to the mass of filler was found to be suitable. The diluted emulsion with the defoamant and the dispersant was added to the sand and filler mix, manually blended with a trowel, and compacted in a specimen mold for evaluation. The water was evaporated from the backfill by heating in an oven in about 378 K for about one week.

When using a latex/kaolin binder it was found preferable to include sodium hexametaphosphate dispersant to prevent coagulation of the latex. In comparison, a backfill material which employed a Masonry sand, a binder composed of acrylic latex and the novaculite filler had an effective thermal conductivity of about 10% greater than the corresponding backfill material using Ottawa sand. Replacing the Hycar 2600×308 latex adhesive with another acrylic latex yielded similar results as that of the Hycar. A soil stabilization grade of acrylic latex, e.g., Rohm and Haas DLR-C is preferred and has been used in field environment wherein the backfill material comprising sand removed on-site was mixed with the latex and filler together with defoamant and surfactant in a cement mixer. Any type of latex is suitable as a binder.

A backfill material employing a polyethylene latex (Poly EM-40) binder was also tested. The effective thermal conductivity of this backfill material was about 30% greater than that of a corresponding backfill material using an acrylic latex binder. However, the polyethylene binder exhibited weak adhesive properties, therefore, if polyethylene adhesive is to be used in the binder, then a suitable additive for increasing the adhesiveness of the polyethylene to the sand and filler should be included in the formulation. For example, one may increase the adhesive properties of the polyethylene by additional coupling agents.

Examples of coupling agents to increase the bonding between the adhesive and filler particles which may be used with polyethylene adhesive are organo functional silane coupling agents such as Dow Corning Z6030 and Z6040.

Figure 9:
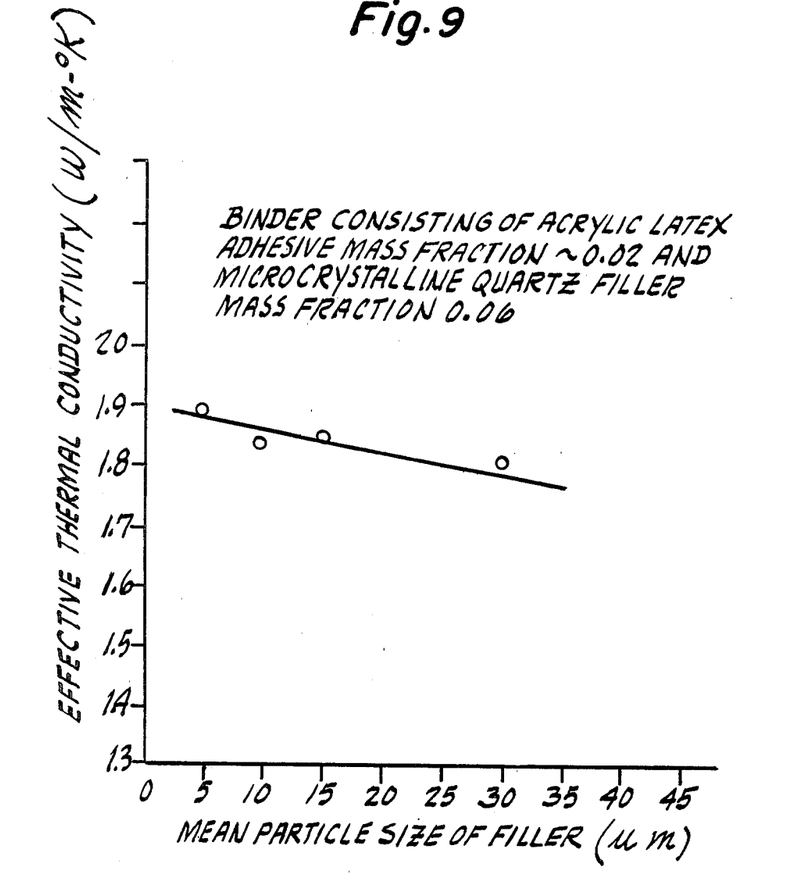
FIG. 9 is a graph showing the effective thermal conductivity as a function of filler particle size.

Experiments to investigate the size of the filler particles in the binder on the effective thermal conductivity of the backfill material were performed. The filler selected for this study was accurately graded microcrystalline quartz with a composition similar to that of the Novaculite. In these experiments, latex adhesive was employed and the latex adhesive to sand plus filler ratio was about 0.02, the same ratio as used for the specimens shown in FIG. 8. FIG. 9 shows the effective thermal conductivity as a function of the filler particle size. It can be seen for the range of filler particle sizes between 5 and 30 microns, the effective thermal conductivity of the backfill material decreases slightly with an increase in the particle size.

What is claimed is:

1. A thermally conductive composition comprising particulate material selected from sand and sand-like particles coupled with a binder comprising an organic adhesive and an inorganic fine particle size filler, said binder being present in a volume fraction, $\phi_B$ such that $\phi_f < \phi_B \leq \phi_c$ wherein $\phi_f$ is the maximum volume fraction of binder for a film forming structure and $\phi_c$ is the volume fraction of binder to start to achieve a void filling structure, and said filler is present in the binder in a concentration range sufficient to give rise to a at least a 40% increase in the thermal conductivity of the composition as compared with that without filler.

2. The thermally conductive composition recited in claim 1 wherein there is a filler concentration in the binder which gives rise to a maximum in the thermal conductivity and wherein the filler is present in a mass fraction within about ±25% of the mass fraction of filler at which the thermal conductivity exhibits this maximum.

3. The thermally conductive composition recited in claims 1 or 2 wherein the volume fraction of binder, $\phi_B$, in the composition is from about 0.02 to 0.1.

4. The thermally conductive composition recited in claims 1 or 2 wherein the volume fraction of binder, $\phi_B$, is from about 0.08 to 0.1.

5. A thermally conductive composition comprising particulate material selected from sand and sand-like particles coupled with a binder comprising an organic adhesive and an inorganic fine particle size filler, said binder being present in a volume fraction, $\phi_B$ such that $\phi_f < \phi_B \leq \phi_c$ wherein $\phi_f$ is the maximum volume fraction of binder for a film forming structure and $\phi_c$ is the volume fraction of binder to start to achieve a void filling structure, and said filler is present in the binder in a concentration range sufficient to give rise to a substantial percentage increase in the thermal conductivity of the composition as compared with that without filler and including at least one additive selected from a surfactant, a defoamer, coupling agent, and dispersant.

6. The thermally conductive composition recited in claim 1 wherein the sand or sand-like particles are predominantly angular in shape.

7. The thermally conductive composition recited in claim 1 wherein said adhesive is selected from the group consisting of wax and an organic polymer.

8. A thermally conductive composition comprising particulate material selected from sand and sand-like particles coupled with a binder comprising an organic adhesive and an inorganic fine particle size filler, said binder being present in a volume fraction, $\phi_B$ such that $\phi_f < \phi_B \leq \phi_c$ wherein $\phi_f$ is the maximum volume fraction of binder for a film forming structure and $\phi_c$ is the volume fraction of binder to start to achieve a void filling structure, and said filler is present in the binder in a concentration range sufficient to give rise to a substantial percentage increase in the thermal conductivity of the composition as compared with that without filler and wherein the adhesive is a low molecular weight polymer selected from the group consisting of latex, epoxy, polyvinylester, polyester and polyether polymers.

9. The thermally conductive composition recited in claim 8 wherein the adhesive is a low molecular weight acrylic latex polymer.

10. The composition recited in claim 1 wherein said filler is selected from the group consisting of quartzitic particles, kaolin, graphite, oxides, mixed oxides and metals.

11. A thermally conductive composition comprising particulate material selected from sand and sand-like particles coupled with a binder comprising an organic adhesive and an inorganic fine particle size filler, said binder being present in a volume fraction, $\phi_B$ such that $\phi_f < \phi_B \leq \phi_c$ wherein $\phi_f$ is the maximum volume fraction of binder for a film forming structure and $\phi_c$ is the volume fraction of binder to start to achieve a void filling structure, and said filler is present in the binder in a concentration range sufficient to give rise to a substantial percentage increase in the thermal conductivity of the composition as compared with that without filler and wherein the average particle size of filler is less than about 50 microns.

12. The composition recited in claim 1 wherein the mass ratio of filler to filler plus adhesive is from 0.58 to 0.66.

13. A thermally conductive composition comprising particulate material selected from sand and sand-like particles coupled with a binder comprising an organic adhesive and an inorganic fine particle size filler, said binder being present in a volume fraction, $\phi_B$ such that $\phi_f < \phi_B \leq \phi_c$ wherein $\phi_f$ is the maximum volume fraction of binder for a film forming structure and $\phi_f$ is the volume fraction of binder to start to achieve a void filling structure, and said filler is present in the binder in a concentration range sufficient to give rise to a substantial percentage increase in the thermal conductivity of the composition as compared with that without filler and wherein the filler is present in an amount ranging between ±0.6 to 1 times the amount which results in a peak effective thermal conductivity of the composition and the volume fraction of binder is between about 0.08 and 0.1.

14. A thermally conductive composition comprises sand coupled with a binder wherein the binder is present in a volume fraction $\phi_B$ of between $\phi_f$ and $\phi_c$ and wherein $\phi_f$ is the maximum volume fraction of binder for a film forming structure and $\phi_c$ is the volume fraction of binder to start to achieve a void filling structure, and wherein the binder comprises and adhesive selected from the group consisting of wax and a water emulsifiable latex polymer together with a filler selected from the group consisting of quartzitic particles, kaolin and graphite, the mass ratio of adhesive to dry sand plus filler being between 0.02 and 0.1 and the mass ratio of filler to dry sand being between 0.05 and 0.25, and the composition having a thermal conductivity of at least 1.0 W/m−K.

15. A method of making an essentially water free thermally conductive composition comprising sand or sand-like particles dispersed in a binder which comprises inorganic filler particles in an adhesive, comprising mixing in a mixing or blending apparatus a quantity of sand or sand-like particles together with an appropriate quantity of a water emulsifiable polymeric adhesive and filler to give a composite having a meniscus structure together with water, a dispersing agent and a defoamer and including the steps of applying the composition to a desired area and drying the composition to remove substantially all the water therein.

* * * * *